(12) United States Patent
Lee et al.

(10) Patent No.: US 8,050,971 B2
(45) Date of Patent: Nov. 1, 2011

(54) METHOD AND SYSTEM FOR PROVIDING COMMODITY INFORMATION IN SHOPPING COMMODITY SEARCHING SERVICE

(75) Inventors: Jin Hwa Lee, Kyunggi-do (KR); Yoon Sook Lee, Kyunggi-do (KR); Hyang Cheol Lee, Kyunggi-do (KR)

(73) Assignee: NHN Business Platform Corporation, Seongnam-si (KR)

( * ) Notice: Subject to any disclaimer, the term of this patent is extended or adjusted under 35 U.S.C. 154(b) by 1189 days.

(21) Appl. No.: 11/552,508

(22) Filed: Oct. 24, 2006

(65) Prior Publication Data
US 2007/0100709 A1   May 3, 2007

(30) Foreign Application Priority Data

Oct. 27, 2005  (KR) ......................... 10-2005-0101572
Oct. 28, 2005  (KR) ......................... 10-2005-0102371

(51) Int. Cl.
*G06Q 30/00* (2006.01)
(52) U.S. Cl. ................. 705/14.54; 705/26.1; 705/27.2; 705/14.4; 705/14.73
(58) Field of Classification Search .............. 705/26, 705/26.1–27.2, 14
See application file for complete search history.

(56) References Cited

U.S. PATENT DOCUMENTS

| 6,513,016 | B1 | 1/2003 | Freeny, Jr. |
| 7,660,737 | B1* | 2/2010 | Lim et al. .................. 705/14.49 |
| 7,668,748 | B1* | 2/2010 | Veach ............................. 705/37 |
| 2001/0044758 | A1 | 11/2001 | Talib et al. |
| 2003/0177076 | A1 | 9/2003 | Might et al. |
| 2003/0212648 | A1* | 11/2003 | Cunningham et al. ............ 707/1 |
| 2007/0260518 | A1* | 11/2007 | Ronen et al. .................... 705/14 |

FOREIGN PATENT DOCUMENTS

| KR | 2002-0006197 | 1/2002 |
| KR | 2005-0018548 | 2/2005 |

OTHER PUBLICATIONS

"A getting-started guide to placing ads on Google;" Toronto Star. Toronto, Ont.: Mat 7, 2005. p. D.03. Retrieved via Proquest on Jun. 18, 2011.*

* cited by examiner

*Primary Examiner* — Michael A. Misiaszek
(74) *Attorney, Agent, or Firm* — H.C. Park & Associates, PLC

(57) ABSTRACT

A method and system for providing product information, which can retrieve an advertising shopping mall that has suggested a bidding price for an upper display area, and can sort product information of the retrieved advertising shopping mall according to a predetermined standard, and display the sorted product information in the upper display area and also can sort product information according to various types of standards, such as a popularity, a sales volume, and the like, and display the sorted product information in a remaining area excluding the upper display area, when sorting and displaying product information on a product search result page.

11 Claims, 13 Drawing Sheets

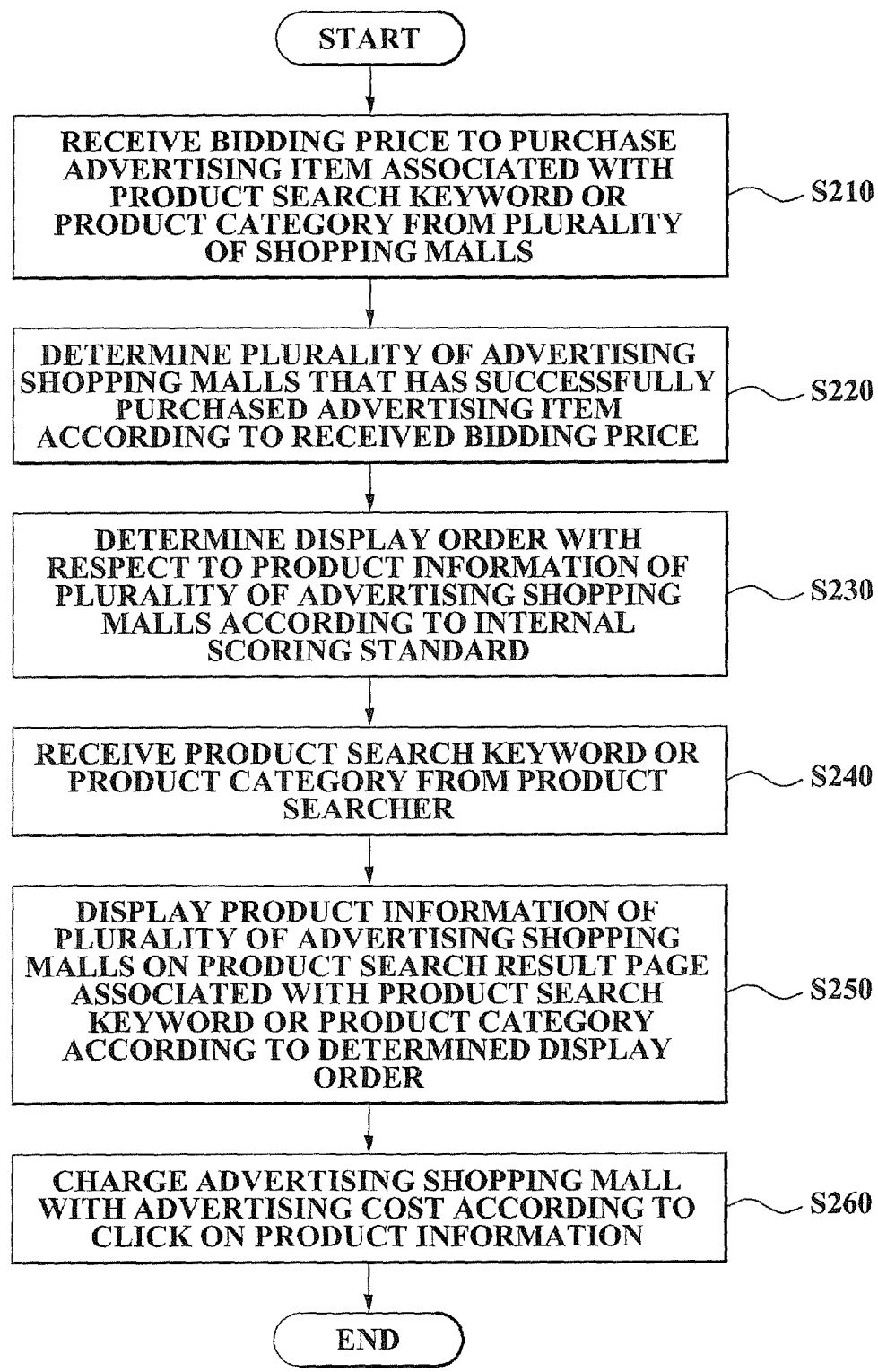

FIG. 3

| SEARCH ▼ | | WEB SEARCH |

SHOPPING CATEGORIES ▼   ☰ PANTS   HOME>CLOTHING/UNDERWEAR>WOMEN>PANTS>DRESS PANTS

SORT BY PRODUCT POPULARITY ▼

| | | | |
|---|---|---|---|
| 311 | ☺☺☺ ~310 | VELVET DRESS PANTS | 28,000WON DOMANGDAEMOON [SHORTCUT] |
| 312 | ☺☺☺ | WOMEN SEMI-DRESS PANTS | 7,200WON INTERPARK [SHORTCUT] |
| 313 | ☺☺☺ | LUXURIOUS DRESS PANTS | 7,740WON ISAVEZONE [SHORTCUT] |
| 314 | ☺☺☺ | IVORY SEMI-DRESS PANTS OR BRIGHT GRAY SEMI-DRESS PANTS | 9,900WON INTERPARK [SHORTCUT] |
| | | OTTO WIDE PANTS | 21,600WON HMALL [SHORTCUT] |
| | | NOVA CHECK DRESS PANTS | 24,900WON GMARKET [SHORTCUT] |

FIG. 5

| SEARCH ▼ | | WEB SEARCH |

SHOPPING CATEGORIES ▼ | ☰ PANTS   HOME>CLOTHING/UNDERWEAR>WOMEN>PANTS>DRESS PANTS

SORT BY PRODUCT POPULARITY ▼

EYE-CATCHING PRODUCTS

| 😊😊😊 | VELVET DRESS PANTS | 26,800WON DOMANGDAEMOON |
| 😊😊😊 | WOMEN SEMI-DRESS PANTS | 7,200WON INTERPARK |
| 😊😊😊 | LUXURIOUS DRESS PANTS | 7,740WON ISAVEZONE |
| 😊😊😊 | IVORY SEMI-DRESS PANTS OR BRIGHT GRAY SEMI-DRESS PANTS | 9,900WON INTERPARK |

510
500

OTTO WIDE PANTS         21,600WON HMALL

NOVA CHECK DRESS PANTS    24,900WON GMARKET

FIG. 7

| SEARCH ▼ | | WEB SEARCH |

| SHOPPING CATEGORIES ▼ | ≡ PANTS | HOME>CLOTHING/UNDERWEAR><br>WOMEN>PANTS>DRESS PANTS |

SORT BY PRODUCT POPULARITY ▼

| | | |
|---|---|---|
| VELVET DRESS PANTS | 26,800WON DOMANGDAEMOON | |
| | SHORTCUT | |
| WOMEN SEMI-DRESS PANTS | 7,200WON INTERPARK | |
| | SHORTCUT | |
| LUXURIOUS DRESS PANTS | 7,740WON ISAVEZONE | |
| | SHORTCUT | |
| IVORY SEMI-DRESS PANTS OR BRIGHT GRAY SEMI-DRESS PANTS | 9,900WON INTERPARK | |
| | SHORTCUT | |

EYE-CATCHING MALL

| | OTTO WIDE PANTS | 21,600WON HMALL |
|---|---|---|
| | | SHORTCUT |
| | NOVA CHECK DRESS PANTS | 24,900WON GMARKET |
| | | SHORTCUT |

| | SEARCH ▼ | HYORI STYLE | WEB SEARCH | BRAND SEARCH | SHOPPING MALL SEARCH |
|---|---|---|---|---|---|

SHOPPING CATEGORIES ▼   ≡ LG 42PX4DW TV        HOME>ELECTRONICS>PDP/PROJECTION/LCDTV>PDP TV

BASIC INFORMATION ▶

LOWEST PRICE      3,040,000WON   ▶PRICE COMPARISON
                                  46 SHOPPING MALLS
USER RATING       ☺ I LOVE IT!! 6/6 (FROM 1 RATING)
PRODUCT DETAILS   HDTV COMPATIBLE, 1000CD,
                  5.1CHANNEL

WRITE A REVIEW

900

⊕ VIEW LARGER

EYE-CATCHING MALL

| | SHOPPING MALL | PRODUCT NAME | PRICE |
|---|---|---|---|
| | TECHNOMART ★★ | [LG] 42PX4DW (SLIM TYPE) | 3,040,000WON ↓ LOWEST |
| | GIVES ★★★★ | [LG PDP] 42PX4DW(INCLUDING SPEAKER) | 3,040,000WON |
| | TECHNOMART | [LG] 42PX4DW(SLIM TYPE) | 3,040,000WON ↓ LOWEST |
| | GIVES | [LG PDP] 42PX4DW(INCLUDING SPEAKER) | 3,040,000WON |
| | INTOBUY | LG 42PX4DW --FREE DELIVERY!-- | 3,040,000WON |

910

LOWEST PRICE

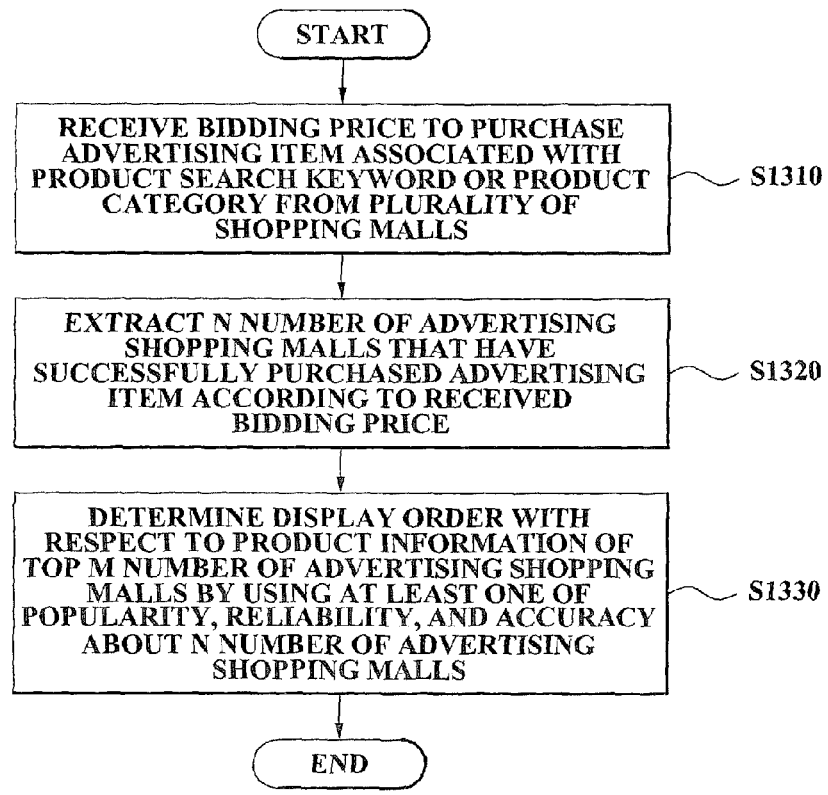
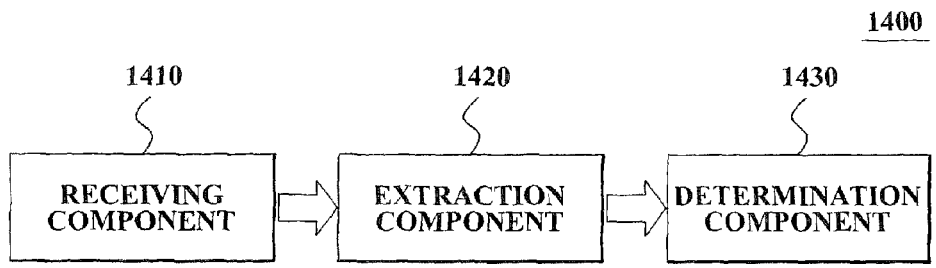

FIG. 15

```
<?xml version="1.0" encoding="euc-kr" ?>
  <troysearch>
  <section_product>
<start>1</start>
<total>2</total>
```
1510

```
  <item docid="42610" rank="1" similarity="0.494987">
<nv_mid>120670</nv_mid>
<cat_id>00030000</cat_id>
<depth1>ELECTRONICS/CELL PHONES</depth1>
<depth2>HOME AUDIO/HOME THEATER</depth2>
<depth3>MP3</depth3>
<depth4>MP3</depth4>
<maker>IRIVER</maker>
<brand>IRIVER</brand>
<model>N10R(256M)</model>
<main_desc>BATTERY LIFE 11 HOURS, USB1.1, WMA/ASF, CLOCK/ALARM</main_desc>
<item>MP3</item>
<capacity />
<price>178000</price>
<hprice>189000</hprice>
<aprice>182500</aprice>
<mall_nums>3</mall_nums>
</item>
```

```
  <item docid="43486" rank="2" similarity="0.494987">
<nv_mid>123121</nv_mid>
<cat_id>00030000</cat_id>
<depth1>ELECTRONICS/CELL PHONES</depth1>
<depth2>HOME AUDIO/HOME THEATER</depth2>
<depth3>MP3</depth3>
<depth4>MP3</depth4>
<maker>IRIVER</maker>
<brand>IRIVER</brand>
<model>N10R(512M)</model>
<main_desc>BATTERY LIFE 11 HOURS, USB1.1, WMA/ASF, CLOCK/ALARM</main_desc>
<item>MP3</item>
<capacity />
<price>185000</price>
<hprice>235000</hprice>
<aprice>210000</aprice>
<mall_nums>2</mall_nums>
</item>
```

```
</section_product>
</troysearch>
```
1520

METHOD AND SYSTEM FOR PROVIDING COMMODITY INFORMATION IN SHOPPING COMMODITY SEARCHING SERVICE

CROSS-REFERENCE TO RELATED APPLICATION

This application claims the benefit of Korean Patent Application No. 10-2005-0101572, filed on Oct. 27, 2005 and Korean Patent Application No. 10-2005-0102371, filed on Oct. 28, 2005, in the Korean Intellectual Property Office, the disclosure of which is incorporated herein by reference.

BACKGROUND OF THE INVENTION

1. Field of the Invention

The present invention relates to a method and system for providing product information in a shopping product search service. More particularly, the present invention relates to a method and system for providing product information, which can receive a bidding price to purchase an advertising item from a plurality of shopping malls, sort product information of a plurality of advertising shopping malls that has successfully purchased the advertising item according to the received bidding price, and display the sorted product information on a product search result page.

2. Description of Related Art

As many users use the Internet due to developments of information communication, and a use rate of the Internet increases, various types of Internet services are being provided. Thus, Internet users may utilize various types of online services, such as shopping, games, movies, music, and the like. Specifically, since online shopping helps users to purchase a product without restriction to a time and a location, while not visiting a store in person, a great number of Internet users are using Internet shopping.

Also, as Internet shopping users increase, shopping mall relay systems for providing information about products of a plurality of shopping malls also increase. As described above, due to developments of online shopping systems, different types of products that are being sold or managed in shopping malls or shopping mall relay systems also geometrically increase. Thus, methods of providing a user with product information are being diversified.

In the conventional online shopping mall or shopping mall relay system, when a user desires to purchase a product, the user must search through products and check product information until a desired product is found.

Specifically, unlike offline shopping, in online shopping, a user may not acquire information about a product from a seller, for example, information about a brand new product or a hot item. Thus, the user may not acquire very helpful information to purchase a desired product.

To overcome the above-described disadvantages, recently, an online shopping mall or a shopping mall relay system sorts and provides product information in an order of a latest product, a hot item, and the like. As an example, when a user enters "dress pants", the online shopping mall or the shopping mall relay system may determine a display order of the retrieved "dress pants" and provide the user with the retrieved "dress pants" according to the determined display order. However, in this case, since hot items are retrieved based on only a sales volume, it may not satisfy an advertiser who desires to advertise "dress pants". Also, when determining only advertising, paid with a certain amount of money, as a hot item, product information satisfying the user's desire may not be provided to the user.

Thus, a new technology which can retrieve an advertising shopping mall that has suggested a bidding price for an upper display area, and can sort product information of the retrieved advertising shopping mall according to a predetermined standard, and display the sorted product information in the upper display area and also can sort product information according to various types of standards, such as a popularity, a sales volume, and the like, and display the sorted product information in a remaining area excluding the upper display area, when sorting and displaying product information on a product search result page, is required.

Also, when a shopping search service retrieves only advertising, paid with a certain amount of advertising fee, to provide product information, the product information desired by the user may not be appropriately provided to the user.

Also, when the shopping search service unconditionally provides product information of an advertising shopping mall that has paid a certain amount of advertising fee, while not reflecting a reliability about product information of the advertising shopping mall, the reliability about the product search service may be deteriorated.

Also, when the shopping search service provides product information according to a search keyword, and in this status, unconditionally provides product information of a plurality of advertising shopping malls that has paid a certain amount of advertising fee without considering an accuracy about a search result, the accuracy of the product search service may be decreased.

Thus, a new technology which can retrieve an advertising shopping mall that has suggested a bidding price for an upper display area, and can sort product information of the advertising shopping mall according to a predetermined standard, and display the sorted product information in the upper display area, when sorting and displaying product information on a product search result page, is required.

BRIEF SUMMARY

The present invention provides a method and system for providing product information, which can retrieve an advertising shopping mall that has suggested a bidding price for an upper display area, and can sort product information of the retrieved advertising shopping mall according to a predetermined standard, and display the sorted product information in the upper display area and also can sort product information according to various types of standards, such as a popularity, a sales volume, and the like, and display the sorted product information in a remaining area excluding the upper display area, when sorting and displaying product information on a product search result page.

The present invention also provides a method and system for providing product information, which can display product information, including particular display information from an advertising item, to be easily distinguished from existing search product information.

The present invention also provides a method and system for providing product information, which can display product information, added with an advertising item, on a first page of a product search result page.

The present invention also provides a method and system for providing product information, which can display product information, added with an advertising item, in a particular area of a product search result page associated with a product category or a product search keyword.

The present invention also provides a method and system for providing product information, which can display product information including particular display information from an advertising item according to an advertising item.

The present invention also provides a method and system for providing product information, which can display product information, including particular display information from an advertising item, in a particular area of a product search result page, only during a valid period of an advertising item.

The present invention also provides a method and system for providing product information, which can display product information, added with an advertising item, in a particular area of a product search result page when sorting the product information in an order of a popularity.

The present invention also provides a method and system for determining a display order of product information, which can retrieve an advertising shopping mall that has suggested a bidding price for an upper display area, and determine a display order of product information of the advertising shopping mall according to a predetermined standard, when sorting and displaying the product information on a product search result page.

The present invention also provides a method and system for determining a display order of product information of an advertising shopping mall according to a popularity of an advertising product.

The present invention also provides a method and system for determining a display order of product information of an advertising shopping mall according to a reliability of an advertising product.

The present invention also provides a method and system for determining a display order of product information of an advertising shopping mall according to an accuracy of an advertising product associated with a search keyword.

The present invention also provides a method and system for determining a display order of product information, which can re-determine a display order according to a predetermined standard, such as a price, a release day, a delivery cost, a remaining balance, and the like, when display orders of product information of a plurality of advertising shopping malls determined based on a popularity, a reliability, and an accuracy are identical to each other.

The present invention also provides a method and system for determining a display order to display product information added with particular display information according to an advertising item.

The present invention also provides a method and system for determining a display order of product information, added with an advertising item. Here, the advertising item is displayed in a particular area of a product search result page only during a valid period of the advertising item.

According to an aspect of the present invention, there is provided a method of providing product information in a shopping product search service, the method including: receiving at least one bid for being listed in a product search result list from a plurality of sellers, the bid being associated with at least one of a product search keyword or a product category, the bid being indicative of a bid amount, the product search result list being displayed in response to a user's request for product search; selecting at least one of the received bids based at least in part upon the bid amount; ordering product information of the sellers' items of the selected bids on a product search result list based at least in part upon a variable condition, the product search result list being associated with at least one of the product search keyword or the product category, the variable condition being independent of the seller's bid amount; and charging the seller's account with an advertising cost according to the number of clicks on the displayed product information.

According to another aspect of the present invention, there is provided a system for providing product information in a shopping product search service, the system including: an interface, the interface receiving at least one bid for being listed in a product search result list from a plurality of sellers, the bid being associated with at least one of a product search keyword or a product category, the bid being indicative of a bid amount, the product search result list being displayed in response to a user's request for product search; a first determination component, the first determination component determining at least one of the received bids based at least in part upon the bid amount; a second determination component, the second determination component determining a display order of product information of the sellers' items of the selected bids on a product search result list based at least in part upon a variable condition, the product search result list being associated with at least one of the product search keyword or the product category, the variable condition being independent of the seller's bid amount; a display, the display displaying product information of the plurality of selected sellers on a product search result page in response to a user's request for product search, the product search result page being associated with the product search keyword or the product category; and a charging component, the charging component charging the seller's account with an advertising cost according to the number of clicks on the product information.

According to still another aspect of the present invention, there is provided a method of determining a display order of product information in a shopping product search service, the method including: receiving at least one bid for being listed in a product search result list from a plurality of sellers, the bid being associated with at least one of a product search keyword or a product category, the bid being indicative of a bid amount, the product search result list being displayed in response to a user's request for product search; selecting a first predetermined number of the received bids based at least in part on the bid amount; and determining a display order with respect to product information of a second predetermined number of the sellers among the selected sellers by using at least one of a popularity, a reliability, and an accuracy about the first predetermined number of the selected sellers, the second predetermined number of the sellers being listed in the top portion of the product search result list.

According to yet another aspect of the present invention, there is provided a system for determining a display order of product information in a shopping product search service, the system including: an interface, the interface receiving at least one bid for being listed in a product search result list from a plurality of sellers, the bid being associated with at least one of a product search keyword or a product category, the bid being indicative of a bid amount, the product search result list being displayed in response to a user's request for product search; an extraction component, the extraction component extracts a first predetermined number of the received bids based at least in part on the bid amount; and a determination component, the determination component determining a display order with respect to product information of a second predetermined number of the sellers among the selected sellers by using at least one of a popularity, a reliability, and an accuracy about the first predetermined number of the selected sellers, the second predetermined number of the sellers being listed in the top portion of the product search result list.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 2 is a flowchart illustrating a method of providing product information according to an exemplary embodiment of the present invention;

FIG. 3 is a view illustrating an example of a screen displaying product information, added with an advertising item, when sorting products in an order of a popularity according to an exemplary embodiment of the present invention;

FIG. 5 is a view illustrating an example of a screen displaying product information, added with an advertising item, in an eye-catching product area using a category class according to an exemplary embodiment of the present invention;

FIG. 7 is a view illustrating an example of a screen displaying product information, added with an advertising item, in an eye-catching mall area using a category class according to an exemplary embodiment of the present invention;

FIG. 9 is a view illustrating an example of a screen displaying product information, added with an advertising item, in an eye-catching mall area of a basic information screen of a particular product according to an exemplary embodiment of the present invention;

FIG. 13 is a flowchart illustrating a method of determining a display order of product information according to an exemplary embodiment of the present invention;

FIG. 14 is a block diagram illustrating a configuration of a product information display order determination system according to an exemplary embodiment of the present invention; and FIG. 15 is a diagram illustrating an example of determining a display order of product information having an identical similarity according to an exemplary embodiment of the present invention.

DETAILED DESCRIPTION OF EMBODIMENTS

Figure 1:
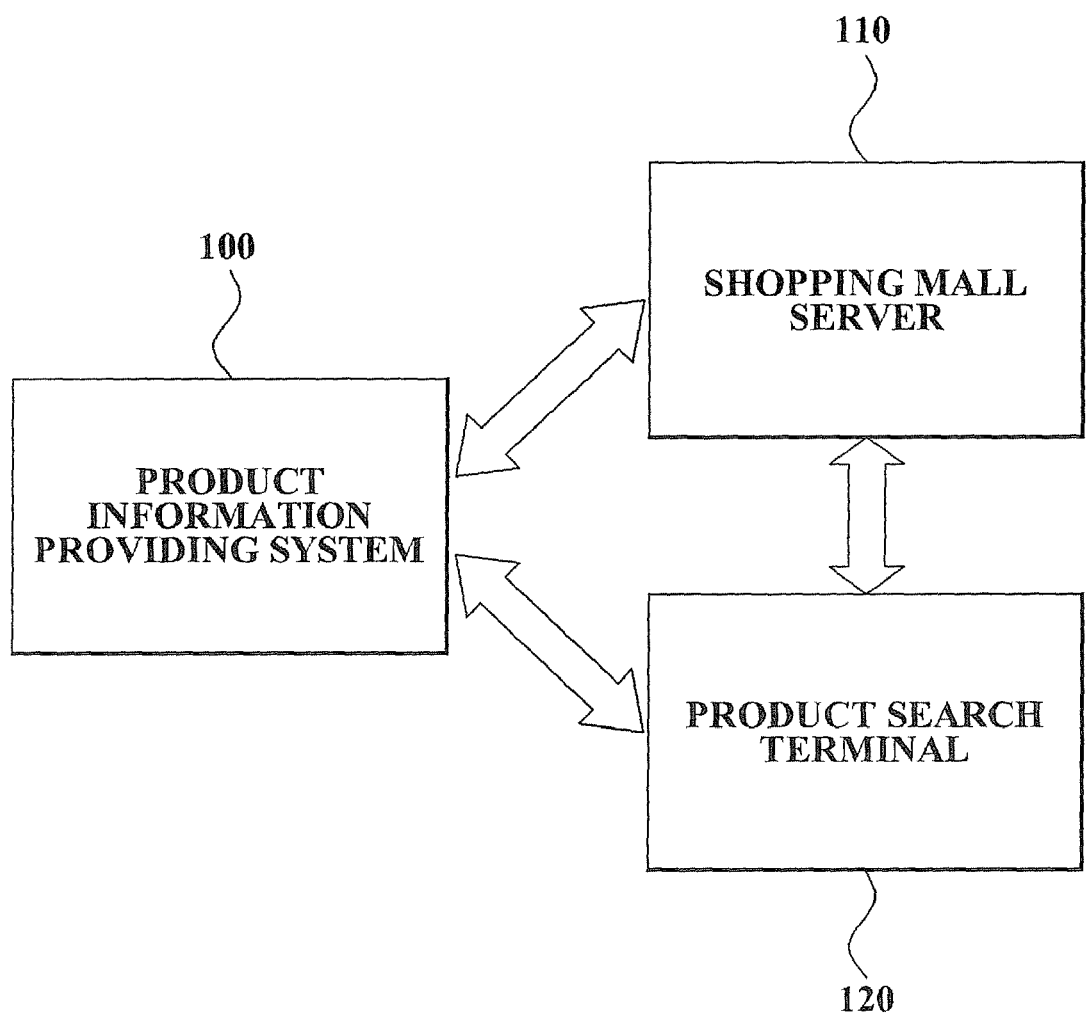
FIG. 1 is a block diagram illustrating a connection of a product information providing system, a shopping mall server, and a product search terminal according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

FIG. 1 is a block diagram illustrating a connection of a product information providing system 100, a shopping mall server 110, and a product search terminal 120 according to an exemplary embodiment of the present invention.

Referring to FIG. 1, the product information providing system 100 receives a bid amount to purchase an advertising item associated with a product search keyword or a product category from a plurality of shopping mall servers or sellers' servers 110. Here, the bid amount affects neither a cost per click nor a display order with respect to product information of a plurality of advertising shopping malls that has successfully purchased the advertising item.

The advertising item in this application refers to a right or license to be displayed in a product search result list in response to user's request for product search. Here, the advertising item may display product information in a particular area of a product search result page, and add particular display information to the product information, to increase sales of a corresponding product. Also, the advertising item may provide an opportunity for changing a location of the particular area and a user interface.

Also, the product information providing system 100 determines a plurality of advertising shopping malls that has successfully purchased the advertising item according to the received bid amount. Here, the plurality of advertising shopping malls includes a predetermined number of advertising shopping malls which are sorted in a descending order of the bid amount. As an example, when 12 shopping malls desire to purchase the advertising item, the product information providing system 100 may determine only 8 shopping malls, which are sorted in a descending order of the bid amount received from the plurality of shopping mall servers 110, as the advertising shopping malls.

Also, the product information providing system 100 determines a display order with respect to product information of the plurality of advertising shopping malls according to a predetermined internal scoring standard. Here, the internal scoring may designate points assigned to product information according to a product search sorting standard, such as a popularity, a reliability, an accuracy, and the like.

Also, the product information providing system 100 receives the product search keyword or the product category from a product search terminal 120.

Also, the product information providing system 100 displays product information of the plurality of advertising shopping malls on a product search result page associated with the product search keyword or the product category according to the determined display order.

Also, the product information providing system 100 charges the advertising shopping mall with an advertising cost according to a click on the product information.

The shopping mall server 110 transmits a bid for purchasing an advertising item, associated with a product search keyword or a product category, to the product information providing system 100, and provides an advertising fee to the product information providing system 100 according to the number of clicks on the product information.

Also, the shopping mall server 110 may provide a product sales webpage linked by a shortcut of each product model to the product information providing system 100, and display product information on the product search terminal 120 via the shortcut.

The product search terminal 120 designates a device that can connect with a wired/wireless network by including a memory unit and a microprocessor, such as a desktop PC, a PDA, a mobile communication terminal, and the like.

Also, the product search terminal 120 may transmit the product search keyword or the product keyword, received from a product searcher, to the product information providing system 100.

FIG. 2 is a flowchart illustrating a method of providing product information according to an exemplary embodiment of the present invention. The product information providing method according to the present exemplary embodiment may be performed by the product information providing system 100 illustrated in FIG. 1.

In operation S210, the product information providing system 100 receives a bid amount to purchase an advertising item associated with a product search keyword or a product category from a plurality of shopping malls. Here, the product search keyword may correspond to keyword information which is used when a product searcher searches for a product. Also, the product category may correspond to category information which is used when the product searcher searches for the product.

In operation S220, the product information providing system 100 determines a plurality of advertising shopping malls that has successfully purchased the advertising item according to the received bid amount. Specifically, the product information providing system 100 may determine a predetermined number of shopping malls, which are sorted in a descending order of the received bid amount, as an advertising shopping mall that has successfully purchased the advertising item.

The advertising item may be assigned with a right to enable displaying product information of the plurality of advertising shopping malls on a first page of a predetermined product search result page. Thus, when sorting the product information in an order of a popularity, the product information providing method may display product information of the plurality of advertising shopping malls on the first page of the product search result page, so that the product searcher may easily notice the product information.

Also, the advertising item may be assigned with a right to enable displaying product information of the plurality of advertising shopping malls in a particular area of the product search result page. Here, the particular area is an eye-catching location of the product search result page when the product searcher searches for a product. The particular area may be designated when the plurality of advertising shopping malls makes a bid for the advertising item. Also, the particular area may correspond to an upper end of a keyword search result screen or in an upper end of a category search result screen. Also, the particular area may correspond to a designated area in a lower end of the keyword search result screen or in a lower end of the category search result screen.

As described above, the product information providing method according to the present exemplary embodiment displays product information of the plurality of advertising shopping malls in the particular area of the product search result page. Thus, it is possible to make the product searcher notice product information of the plurality of advertising shopping malls more easily than general product information.

Also, when displaying product information of the plurality of advertising shopping malls in the particular area of the product search result page, particular display information of the advertising item may be added thereto. Specifically, since the advertising item adds the particular display information to product information of the advertising shopping mall in the product search result page, the product searcher may notice product information advertising shopping malls more easily than other general product information.

Also, the advertising item may be utilized when product information is sorted in an order of a popularity on the product search result page. Specifically, when sorting the product information in an order of the popularity on the product search result page, the advertising item may be assigned with a right to enable displaying product information of the plurality of advertising shopping malls in an upper end of the first page of the product search result page.

Also, when sorting product information of the plurality of advertising shopping malls in an order of a price on the product search result page, particular display information of the advertising item may be added to the product information and display the product information in a lower end of the first page of the product search result page.

Also, a valid period of the advertising item is designated, and the advertising item may display product information of the plurality of advertising shopping malls in the particular area of the product search result page only during the valid period. Also, when the valid period has elapsed, the advertising item may display product information of the plurality of advertising shopping malls in the same format as other general product information.

In operation S230, the product information providing system 100 determines a display order with respect to product information of the plurality of advertising shopping malls according to a predetermined internal scoring standard. A method of determining a display order with respect to product information of the plurality of advertising shopping malls according to the internal scoring standard will be further described in detail with reference to FIG. 13.

The internal scoring standard includes information associated with product information, such as a popularity, a reliability, an accuracy, and the like. Here, the popularity may include a previous day's number of clicks on a shortcut to product information, an increase and decrease of a number of clicks on the shortcut to the product information, or a number of page views (PV) of the product information. The previous day's number of clicks designates a number of valid clicks that enabled a connection to a shopping mall of the product information on the previous day. Also, the increase and decrease of a number of clicks on the shortcut is calculated by subtracting a predetermined previous period's average number of clicks on the shortcut to the product information from the previous day's number of clicks on the shortcut to the product information. Also, the reliability is determined by an average user rating or a shopping mall class. Here, the average user rating designates a user rating on a corresponding product and the shopping mall class designates a shopping mall rating with respect to a corresponding mall. The accuracy designates a value which is acquired by indexing a sentence using a product name as a query, and executing a character string algorithm, to calculate a similarity using the product name. Specifically, a sorting order may be determined according to a similarity between an entered product name and a retrieved product, when entering the product name as the query, and retrieving the product according to the query.

Specifically, in operation S230, the product information providing system 100 may extract an N number of advertising shopping malls that have successfully purchased the advertising item according to the received bid amount, and determine a display order with respect to product information of a top M number of advertising shopping malls by using at least one of a popularity, a reliability, and an accuracy about the N number of advertising shopping malls.

Also, in addition to the popularity, the reliability, and the accuracy, when various types of fields, such as a 'price', a 'release day', a 'delivery cost', a 'remaining balance', and the like are added to database fields, the internal scoring standard may be utilized as a more accurate sorting standard.

In operation S240, the product information providing system 100 receives the product search keyword or the product category from a product searcher. The product searcher may enter a desired product search keyword, for example, 'hyori style', into the product information providing system 100 via the product search terminal 120. Also, the product searcher may enter a desired product category, for example, 'pants', into the product information providing system 100 via the product search terminal 120.

In operation S250, the product information providing system 100 displays product information of the plurality of advertising shopping malls on a product search result page associated with the product search keyword or the product category according to the determined display order. Hereinafter, a display method of product information will be described with reference to FIGS. 3 through 10.

FIG. 3 is a view illustrating an example of a screen displaying product information, added with an advertising item, when sorting products in an order of a popularity according to an exemplary embodiment of the present invention.

As shown in FIG. 3, when receiving a product category, for example, 'dress pants', from a product searcher, and sorting products in an order of a popularity, the product information providing system 100 adds particular display information 310 to product information 311, 312, 313, and 314 of the plurality of advertising shopping malls according to the advertising item, and displays the product information 311 through 314 on a first page of a product search result page associated with the 'dress pants', to be distinguished from other general product information, in operation S250. Here, a display order of the product information 311 through 314 is determined according to the internal scoring standard, not the bid amount. Also, the internal scoring standard includes a popularity, a reliability, and an accuracy about the four extracted advertising shopping malls. Thus, the display order of the product information 311 through 314 of the four advertising shopping malls may be determined in a descending order of the popularity, the reliability, and the accuracy.

Also, the product information providing system 100 displays the product information 311 through 314 of the plurality of advertising shopping malls on the first page of the product search result page only during a valid period of the advertising item.

When the valid period of the advertising item has elapsed, the product information providing system 100 may omit the addition of the particular display information 310 of the advertising item, re-sort the product information 311 through 314 according to the internal scoring method, and display the re-sorted product information 311 through 314 on the product search result page.

Figure 4:
FIG. 4 is a view illustrating an example of a screen displaying product information, added with an advertising item, when sorting products in an ascending order of a price according to an exemplary embodiment of the present invention.

FIG. 4 is a view illustrating an example of a screen displaying product information, added with an advertising item, when sorting products in an ascending order of a price according to an exemplary embodiment of the present invention.

As shown in FIG. 4, when receiving a product category, for example, 'dress pants', from a product searcher, and sorting products in an ascending order of a price, the product information providing system 100 displays product information of an advertising shopping mall, added with particular display information 410 according to the advertising item, on a first page of a product search result page associated with the 'dress pants', to be easily distinguished from other general product information sorted in an ascending order of the price, in operation S250. Specifically, according to the present invention, although the product information of the advertising shopping mall is displayed in a lower end of the first page of the product search result page due to a comparatively low price, the particular display information 410 is added to the product information. Thus, it is possible to make the product searcher notice the product information more easily than other general product information.

Also, when the valid period of the advertising item has elapsed, the product information providing system 100 may omit the addition of the particular display information 410 of the advertising item, re-sort the product information according to the internal scoring method, and display the re-sorted product information on the product search result page.

FIG. 5 is a view illustrating an example of a screen displaying product information, added with an advertising item, in an eye-catching product area using a category class according to an exemplary embodiment of the present invention.

As shown in FIG. 5, when receiving a product category, for example, 'dress pants', from a product searcher, and sorting products in an order of a popularity, the product information providing system 100 displays product information of the plurality of advertising shopping malls, added with particular display information 510 according to the advertising item, in an eye-catching product area 500 of an upper end of a product search result page associated with the 'dress pants', to be distinguished from other general product information, in operation S250, Also, when the valid period of the advertising item has elapsed, the product information providing system 100 may omit the addition of the particular display information 510 of the advertising item, re-sort the product information according to the internal scoring method, and display the re-sorted product information on the product search result page.

Figure 6:
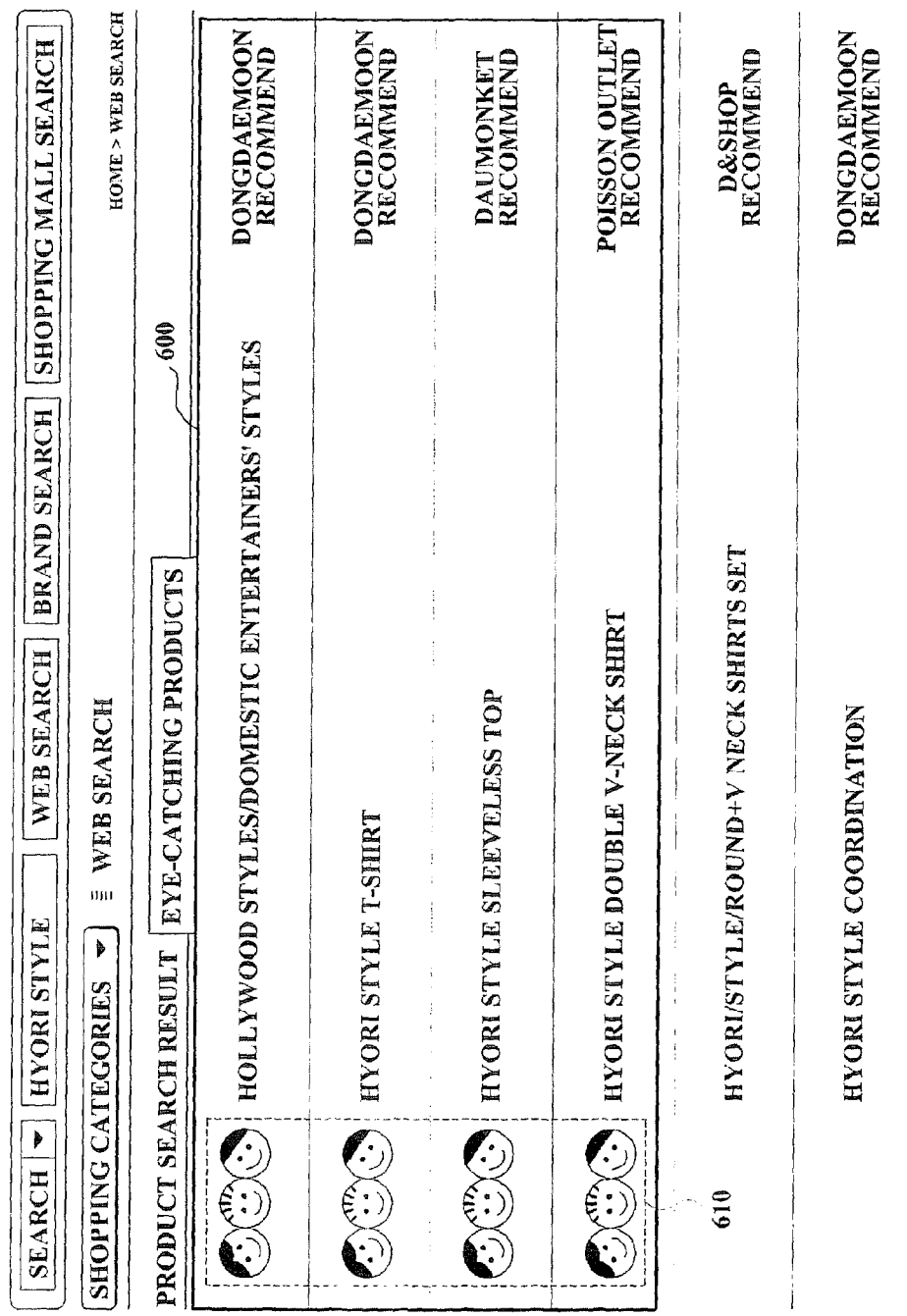
FIG. 6 is a view illustrating an example of a screen displaying product information, added with an advertising item, in an eye-catching product area using a keyword search result according to an exemplary embodiment of the present invention.

FIG. 6 is a view illustrating an example of a screen displaying product information, added with an advertising item, in an eye-catching product area using a keyword search result according to an exemplary embodiment of the present invention.

As shown in FIG. 6, when receiving 'hyori style' as a product search keyword from the product searcher, the product information providing system 100 displays product information of the plurality of advertising shopping malls, added with particular display information 610 according to the advertising item, in an eye-catching product area 600 of an upper end of a product search result page associated with the product search keyword, to be distinguished from other general product information, in operation S250.

Also, when the valid period of the advertising item has elapsed, the product information providing system 100 may omit the addition of the particular display information 610 of the advertising item, re-sort the product information according to the internal scoring method, and display the re-sorted product information on the product search result page.

FIG. 7 is a view illustrating an example of a screen displaying product information, added with an advertising item, in an eye-catching mall area using a category class according to an exemplary embodiment of the present invention.

As shown in FIG. 7, when receiving a product category, for example, 'dress pants', from a product searcher, and sorting products in an order of a popularity, the product information providing system 100 displays product information of the plurality of advertising shopping malls, added with particular display information 710 according to the advertising item, in an eye-catching mall area 700 of a lower end of a product search result page associated with the 'dress pants', to be distinguished from other general product information, in operation S250.

Also, when the valid period of the advertising item has elapsed, the product information providing system 100 may omit the addition of the particular display information 710 of the advertising item, re-sort the product information according to the internal scoring method, and display the re-sorted product information on the product search result page.

Figure 8:
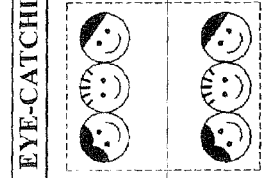
FIG. 8 is a view illustrating an example of a screen displaying product information, added with an advertising item, in an eye-catching mall area using a keyword search result, according to an exemplary embodiment of the present invention.

FIG. 8 is a view illustrating an example of a screen displaying product information, added with an advertising item, in an eye-catching mall area using a keyword search result, according to an exemplary embodiment of the present invention.

As shown in FIG. 8, when receiving 'hyori style' as a product search keyword from the product searcher, the product information providing system 100 displays product information of the plurality of advertising shopping malls, added with particular display information 810 according to the advertising item, in an eye-catching mall area 800 of a lower end of a product search result page associated with the product search keyword, to be distinguished from other general product information, in operation S250.

Also, when the valid period of the advertising item has elapsed, the product information providing system 100 may omit the addition of the particular display information 810 of the advertising item, re-sort the product information according to the internal scoring method, and display the re-sorted product information on the product search result page.

FIG. 9 is a view illustrating an example of a screen displaying product information, added with an advertising item, in an eye-catching mall area of a basic information screen of a particular product according to an exemplary embodiment of the present invention.

As shown in FIG. 9, when receiving a selection on particular product information from the product searcher, the product information providing system 100 displays product information of the plurality of advertising shopping malls, added with particular display information 910 according to the advertising item, in an eye-catching mall area 900 of a product information result page associated with the particular product.

Also, when the valid period of the advertising item has elapsed, the product information providing system 100 may omit the addition of the particular display information 910 of the advertising item, re-sort the product information according to the internal scoring method, and display the re-sorted product information on the product search result page.

Figure 10:
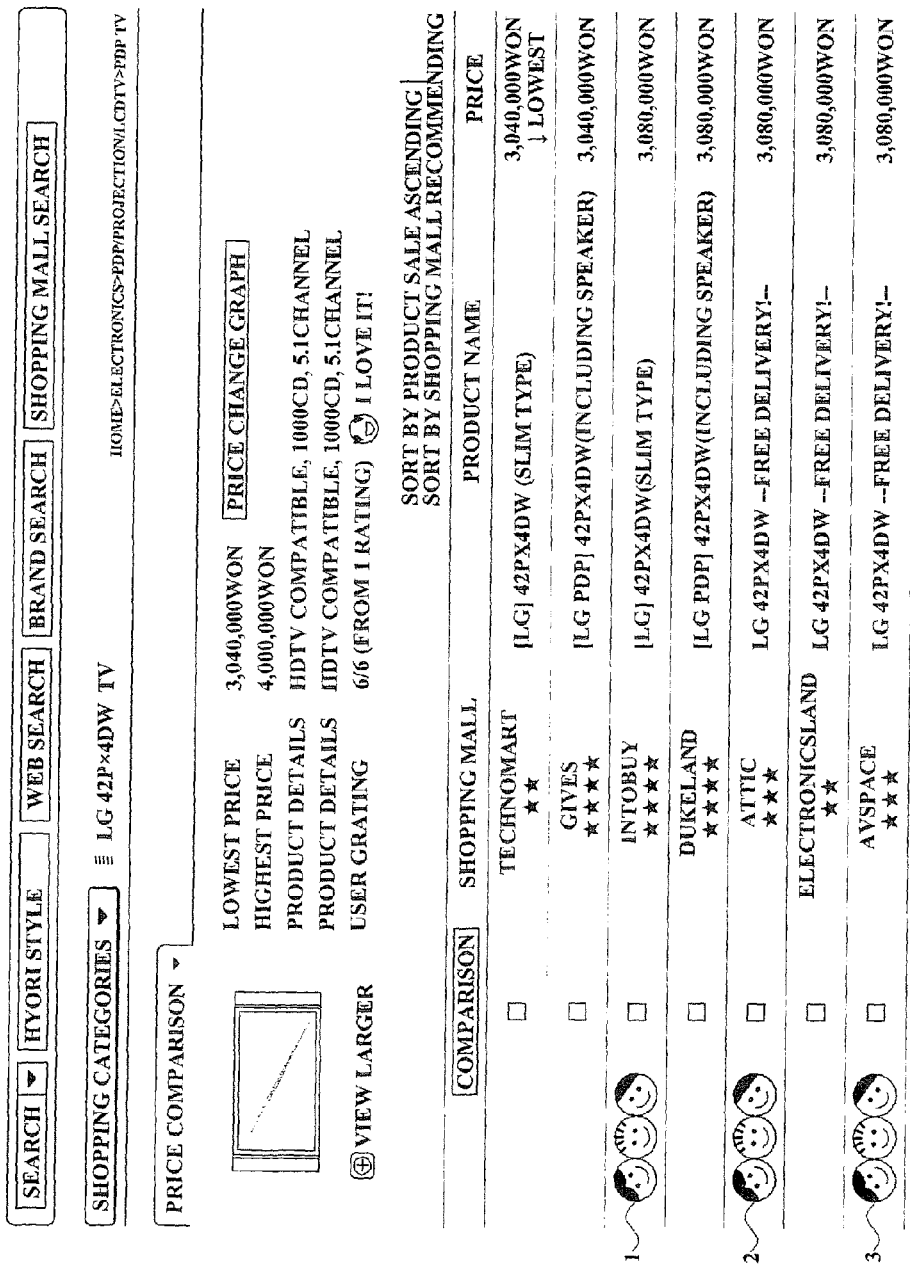
FIG. 10 is a view illustrating an example of a screen displaying product information, added with an advertising item, in a price comparison area of a particular product according to an exemplary embodiment of the present invention.

FIG. 10 is a view illustrating an example of a screen displaying product information, added with an advertising item, in a price comparison area of a particular product according to an exemplary embodiment of the present invention.

As shown in FIG. 10, when receiving a selection on a price comparison of particular product information from the product searcher, the product information providing system adds particular display information 1011, 1012, and 1013 according to the advertising item to product information of the plurality of advertising shopping malls, which are sorted in an ascending order of a price, and displays the sorted product information on a product information result page associated with the particular product, in operation S250.

As described above, product information of the advertising shopping mall is not limited to a particular area of the product search result page in an ascending order of a price, but added with the particular display information 1011 through 1013 according to the advertising item. Thus, according to the present invention, it is possible to make the product searcher notice the product information of the advertising shopping mall more easily than other product information.

Also, when the valid period of the advertising item has elapsed, the product information providing system 100 may omit the addition of the particular display information 1011 through 1013 of the advertising item, re-sort the product information according to the internal scoring method, and display the re-sorted product information on the product search result page.

In operation S260, the product information providing system 100 charges the advertising shopping mall with an advertising cost according to a click on the product information. Specifically, in the shopping product search service, when a click on product information of the advertising shopping mall occurs on the product search result page according to the product category or the product search keyword, the product information providing system 100 may charge the advertising shopping mall with an advertising cost corresponding to the click. Here, the advertising cost may be calculated by "[cost per click]×[number of clicks]". The cost per click may be calculated by an equation, such as "[product price]×[fee rate for each section]". In an exemplary embodiment of the present invention, the cost per click is charged only when the click corresponds to a valid click. When the click is determined as a suspicious click via a predetermined validity measurement method, the cost per click may be invalidated to not be charged. The validity measurement method may include various types of methods, for example, a method of determining whether a number of clicks generated was two or more may be determined as an invalid click when a single Internet Protocol (IP) address generates two or more clicks for an individual product within a 24 hour period, a method of determining a corresponding click as an invalid click when a difference between a clicked time and a product display time is greater than a predetermined period of time (e.g. 1 hour), a method of determining a corresponding click as an invalid click when an IP address the product display is presented to and an IP address the click is received from are different from each other, and the like.

As described above, according to the present invention, the product information providing system 100 may display product information in an area with a higher purchase rate, i.e. in an area where many clicks may occur, while not charging a cost that increases a cost per click. Thus, the product information providing system 100 may generate additional advertising benefits by displaying product information in an area where many clicks may occur.

Figure 11:
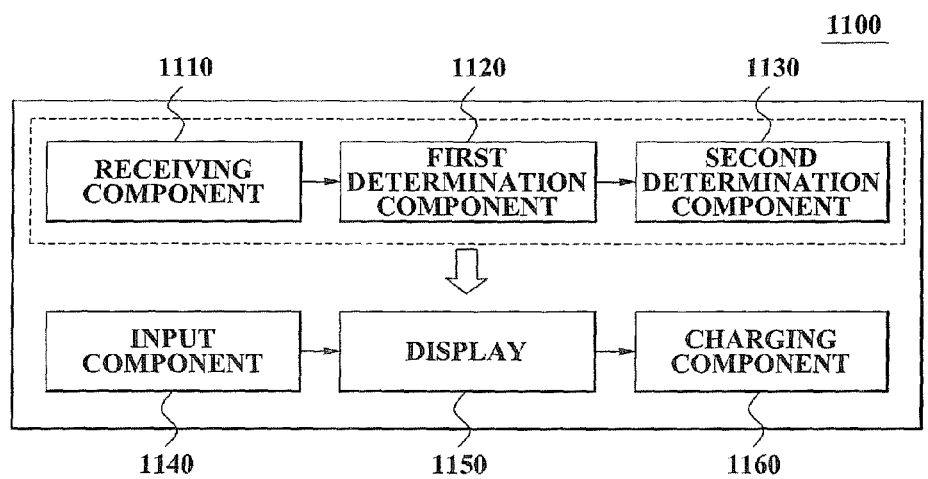
FIG. 11 is a block diagram illustrating a configuration of a product information providing system according to an exemplary embodiment of the present invention.

FIG. 11 is a block diagram illustrating a configuration of a product information providing system 1100 according to an exemplary embodiment of the present invention.

Referring to FIG. 11, the product information providing system 1100 includes a receiving component 1110, a first determination component 1120, a second determination component 1130, an input component 1140, a display 1150, and a charging component 1160. The receiving component 1110 receives a bid amount to purchase an advertising item associated with a product search keyword or a product category from a plurality of shopping malls.

The receiving component 1110 receives a bid amount to purchase an advertising item associated with a product search keyword or a product category from a plurality of shopping malls.

The first determination component 1120 determines a plurality of advertising shopping malls that has successfully purchased the advertising item according to the received bid amount. Specifically, the first determination component 1120 may determine a predetermined number of shopping malls which are sorted in a descending order of the received bid amount received from the plurality of shopping malls, as the advertising shopping mall. As an example, when the bid amount is received from 12 shopping malls, the first determination unit 1120 may determine the top 8 shopping malls, which are sorted in a descending order of the bid amount, as the advertising shopping mall.

The second determination component 1130 determines a display order of product information of the plurality of advertising shopping malls according to a predetermined internal scoring standard. Here, the internal scoring may designate points which are assigned to product information according to a retrieved product sorting standard, such as a popularity, a reliability, an accuracy, and the like.

The input component 1140 receives the product search keyword or the product category from a product searcher. Specifically, the input component 1140 may receive the product searcher's desired product search keyword or product category via the product search terminal.

The display 1150 displays product information of the plurality of advertising shopping malls on a product search result page associated with the product search keyword or the product category according to the determined display order.

Also, the display 1150 may display product information of the plurality of advertising shopping malls on a first page of the product search result page.

As described, according to the present invention, product information of the plurality of advertising shopping malls that has purchased the advertising item is displayed on the first page of the product search result page. Thus, it is possible to increase a probability that the product searcher may click the product information, and thus improve additional advertising benefits.

Also, the display 1150 may display product information of the plurality of advertising shopping malls in a particular area of the product search result page. Here, the particular area may correspond to an upper end or a lower end of the product search result page.

Also, the display 1150 may display product information of the plurality of advertising shopping malls in the particular area of the product search result page only during the valid period of the advertising item. As an example, when the valid period of the advertising item is a week, the display 1150 may display product information of the plurality of advertising shopping malls in the particular area of the product search result page for only one week. Also, when the valid period of the advertising item has elapsed, the display 1150 may re-sort product information of the plurality of advertising shopping malls according to an internal scoring method, and display the re-sorted product information, in the same format as product information of a general shopping mall, on the product search result page.

As described above, according to the present invention, when the valid period of the advertising item has elapsed, corresponding product information is automatically converted into general product information. Thus, an advertising content and a service content may coexist on a single page.

Also, according to the present invention, a product sorting standard or a mall sorting standard is determined according to the internal scoring method. Thus, when adding the advertising item without being affected by the bid amount, it is possible to apply a feature of product information of the advertising shopping mall.

Particular display information of the advertising item may be added to product information of the plurality of advertising shopping malls. Specifically, since the particular display information is added to product information of the plurality of advertising shopping malls applied with the advertising item, the product information is more eye-catching than general product information. Thus, it is possible to lead a product searcher to click product information of the plurality of advertising shopping malls.

Also, the advertising item may be utilized when the product information is sorted in an order of a popularity on the product search result page. Specifically, in this case, product information of the plurality of advertising shopping malls is displayed in an upper end of the first page of the product search result page. Thus, it is possible to make the product searcher notice product information of the plurality of advertising shopping malls more easily than general product information.

The charging component 1160 charges the advertising shopping mall with an advertising cost according to a click on the product information. Specifically, in the shopping product search service, when a click on product information of the advertising shopping mall occurs on the product search result page according to the product category or the product search keyword, the charging component 1160 may charge the advertising shopping mall with an advertising cost corresponding to the click. Here, the advertising cost may be calculated by "[cost per click]×[number of clicks]". The cost per click may be calculated by an equation such as "[product price]×[fee rate for each section]". In an exemplary embodiment of the present invention, the cost per click is charged only when the click corresponds to a valid click. When the click is determined as a suspicious click via a predetermined validity measurement method, the cost per click may be invalidated to not be charged. The validity measurement method may include various types of methods, for example, a method of determining whether a number of clicks generated was two or more may be determined as an invalid click when a single Internet Protocol (IP) address generates two or more clicks for an individual product within a 24 hour period, a method of determining a corresponding click as an invalid click when a difference between a clicked time and a product display time is greater than a predetermined period of time (e.g. 1 hour), a method of determining a corresponding click as an invalid click when an IP address the product display is presented to and an IP address the click is received from are different from each other, and the like.

As described above, the product information providing system 110 may not charge an advertising shopping mall server that has successfully purchased the advertising item with a cost to increase a cost per click, and may display product information of the advertising shopping mall in an area with a higher purchase rate, i.e. in an area where many clicks may occur. Thus, the product information providing system 100 may generate additional advertising benefits by displaying product information of the advertising shopping mall in an area where many clicks may occur.

Figure 12:
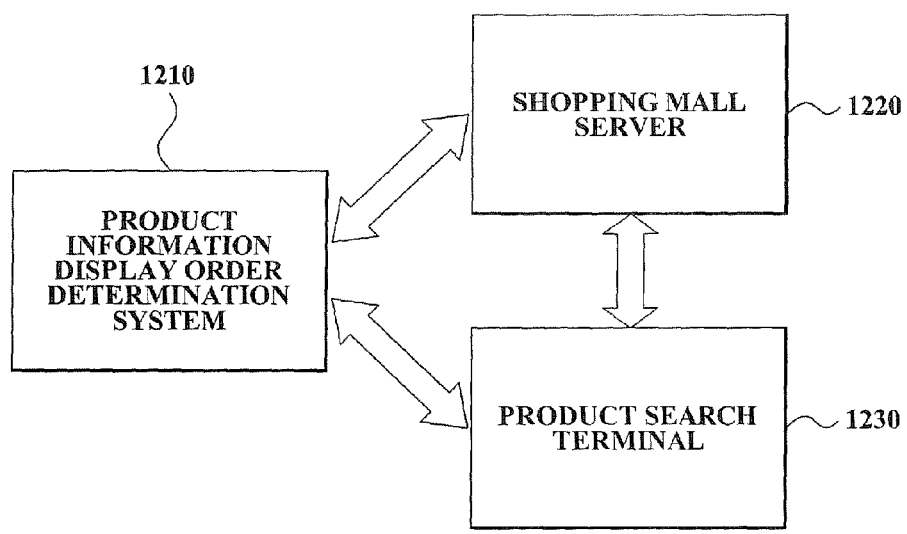
FIG. 12 is a block diagram illustrating a connection of a product information display order determination system, a shopping mall server, and a product search terminal according to an exemplary embodiment of the present invention.

FIG. 12 is a block diagram illustrating a connection of a product information display order determination system 1210, a shopping mall server 1220, and a product search terminal 1230 according to an exemplary embodiment of the present invention.

Referring to FIG. 12, the product information display order determination system 1210 receives a bid amount to purchase an advertising item associated with a product search keyword or a product category from a plurality of shopping mall servers 1220. Here, the bid amount affects neither a cost per click nor a display order with respect to product information of a plurality of advertising shopping malls that has successfully purchased the advertising item.

Here, the advertising item may display product information in a particular area of a product search result page, and add particular display information to the product information, to increase sales of a corresponding product. Also, the advertising item may provide an opportunity for changing a location of the particular area and a user interface.

Also, the product information display order determination system 1210 extracts an advertising shopping mall that has successfully purchased the advertising item according to the received bid amount. Here, the advertising shopping mall may correspond to an N number of shopping malls which are sorted in a descending order of the received bid amount to purchase the advertising item. As an example, when 12 shopping malls desire to purchase the advertising item, the product information display order determination system 1210 may extract only 8 shopping malls, which are sorted in a descending order of the bid amount received from the plurality of shopping mall servers 1220, as the advertising shopping malls.

Also, the product information display order determination system 1210 determines a display order with respect to product information of a top M number of advertising shopping malls according to a popularity, a reliability, or an accuracy about the extracted N number of advertising shopping malls. Here, the popularity, the reliability, and the accuracy may designate scores which are assigned to product information of the advertising shopping mall. As an example, when 8 advertising shopping malls are extracted, it is possible to determine the display order with respect to product information of the top 4 advertising shopping malls, based on the popularity, the reliability, or the accuracy about each advertising shopping mall.

Also, the product information display order determination system 1210 may display product information of the advertising shopping mall on a product search result page associated with the product search keyword or the product category according to the determined display order. Specifically, when the valid period of the advertising item has elapsed, the product information display order determination system 1210 may omit the addition of the particular display information 310 of the advertising item, as shown in FIG. 3, re-sort the product information according to the popularity, the reliability, or the accuracy, and display the re-sorted product information on the product search result page.

Also, the product information display order determination system 1210 charges the advertising shopping mall with an advertising cost according to a click on the product information.

Specifically, in the shopping product search service, when a click on product information of the advertising shopping mall occurs on the product search result page according to the product category or the product search keyword, the product information display order determination system 1210 may charge the advertising shopping mall with an advertising cost corresponding to the click.

Here, the advertising cost may be calculated by "[cost per click]×[number of clicks]". The cost per click may be calculated by an equation such as "[product price]×[fee rate for each section]". In an exemplary embodiment of the present invention, the cost per click is charged only when the click corresponds to a valid click. When the click is determined as a suspicious click via a predetermined validity measurement method, the cost per click may be invalidated to not be charged. The validity measurement method may include various types of methods, for example, a method of determining whether a number of clicks generated was two or more may be determined as an invalid click when a single Internet Protocol (IP) address generates two or more clicks for an individual product within a 24 hour period, a method of determining a corresponding click as an invalid click when a difference between a clicked time and a product display time is greater than a predetermined period of time (e.g. 1 hour), a method of determining a corresponding click as an invalid click when an IP address the product display is presented to and an IP address the click is received from are different from each other, and the like.

As described above, according to the present invention, the product information display order determination system 1210 may display product information in an area with a higher purchase rate, i.e. in an area where many clicks may occur, while not charging a cost to increase a cost per click.

Thus, according to the present invention, it is possible to generate additional advertising benefits by displaying product information in an area where many clicks may occur.

The shopping mall server 1220 transmits a bid amount for purchasing an advertising item associated with a product search keyword or a product category to the product information display order determination system 1210, and provides an advertising fee to the product information display order determination system 1210 according to a click on the product information.

Also, the shopping mall server 1220 may provide a product sales webpage linked by a shortcut of each product model to the product information display order determination system 1210, and display product information to the product search terminal 1230 via the shortcut.

The product search terminal 1230 designates a device that can connect with a wired/wireless network by including a memory unit and a microprocessor, such as a desktop PC, a PDA, a mobile communication terminal, and the like.

Also, the product search terminal 1230 may transmit the product search keyword or the product keyword, received from a product searcher, to the product information display order determination system 1210.

FIG. 13 is a flowchart illustrating a method of determining a display order of product information according to an exemplary embodiment of the present invention. The method of determining a display order of product information according to the present exemplary embodiment may be performed by the product information display order determination system 1210.

In operation S1310, the product information display order determination system 1210 receives a bid amount to purchase an advertising item associated with a product search keyword or a product category from a plurality of shopping malls. Here, the product search keyword may correspond to keyword information which is used when a product searcher searches for a product. Also, the product category may correspond to category information which is used when the product searcher searches for the product.

In operation S1320, the product information display order determination system 1210 extracts an N number of advertising shopping malls that have successfully purchased the advertising item according to the received bid amount. Specifically, the product information display order determination system 1210 may extract the N number of shopping malls in a descending order of the received bid amount, as the advertising shopping malls that have successfully purchased the advertising item.

In operation S1330, the product information display order determination system 1210 determines a display order with respect to product information of the top M number of advertising shopping malls by using at least one of a popularity, a reliability, and an accuracy about the N number of advertising shopping malls.

Here, the popularity may include a previous day's number of clicks on a shortcut to product information, an increase and decrease of a number of clicks on the shortcut to the product information, or a number of page views (PV) of the product information. As described, according to the present invention, when determining a display order with respect to product information of the plurality of advertising shopping malls, a popularity of product information of the advertising shopping mall is reflected. Thus, it is possible to preferentially provide a user with comparatively popular product information.

The previous day's number of clicks may be determined by a number of valid clicks that enabled a link to a shopping mall of the product information on the previous day. As an example, when the number of valid clicks that enabled the link to the shopping mall of the product information on the previous day is '100', the previous day's number of clicks may be determined as '100'. Specifically, the previous day's number of clicks designates an absolute popularity determination standard showing how many product searchers visited the shopping mall of the product information.

As described above, according to the present invention, a display order of product information of the advertising shopping mall may be determined based on the previous day's number of clicks. Thus, it is possible to provide a user with product information of an advertising shopping mall, reflecting an absolute popularity.

Also, the increase and decrease of a number of clicks on the shortcut is calculated by subtracting a predetermined previous period's average number of valid clicks on the shortcut to the product from the previous day's number of valid clicks on the shortcut to the product. As an example, when the previous day's number of valid clicks on the shortcut to the product is '100', and the previous seven days' average number of valid clicks on the shortcut is '10', the increase and decrease of a number of clicks on the shortcut becomes '100−10=90'. Thus, it can be determined that the popularity of the product has increased in comparison to the past week.

Also, when the previous day's number of valid clicks on the shortcut to the product is '80', and the previous seven days' average number of valid clicks on the shortcut is '100', the increase and decrease of a number of clicks on the shortcut becomes '80−100=−20'. Thus, it can be determined that the popularity of the product has decreased in comparison to the past week.

As described above, according to the present invention, a display order of product information of an advertising shopping mall may be determined based on the increase and decrease of a number of clicks on product information of the advertising shopping mall. Thus, it is possible to provide a user with product information of the advertising shopping mall, reflecting an increase and decrease in a comparative popularity.

The PV corresponds to when the product information includes a PV. Also, the PV may designate the popularity of the product.

As described above, according to the present invention, a display order of product information of the advertising shopping mall may be determined based on PV with respect to the product information of the advertising shopping mall. Thus, it is possible to provide a user with product information of the advertising shopping mall according to the popularity of the product.

Also, the reliability is determined by an average user rating or a shopping mall class. Here, the average user rating designates a user rating on a corresponding product and the shopping mall class designates a shopping mall rating with respect to a corresponding mall.

As described, according to the present invention, a display order of product information of the advertising shopping mall may be determined based on the reliability about product information of the advertising shopping mall. Thus, it is possible to preferentially provide a user with product information of a comparatively reliable advertising shopping mall.

The accuracy designates a value which is acquired by indexing a sentence using a product name as a query, and executing a character string algorithm, to calculate a similarity using the product name. Specifically, a sorting order may be determined according to a similarity between an entered product name and a retrieved product, when entering the product name as the query, and retrieving the product according to the query.

As an example, a search result, which is acquired when receiving a keyword, such as "iriver mp3player n10r 256 mega" as the query, indexing the entered keyword, and executing a character string algorithm, is shown in FIG. 15.

Referring to FIG. 15, when a similarity between product information 1510 of a first advertising shopping mall and product information 1520 of a second advertising shopping mall is identical to each other, the product information display order determination system 1210 may assign a comparatively higher display order to the product information 1510 of the first advertising shopping mall which is cheaper than the product information 1520 of the second advertising shopping mall.

Also, in addition to the popularity, the reliability or the accuracy, when various types of fields, such as a 'price', a 'release day', a 'delivery cost', a 'remaining balance', and the like are added to database fields, the internal scoring standard may be utilized as a more accurate sorting standard.

As described above, according to the present invention, when a popularity, a reliability, and an accuracy with respect to product information of a plurality of advertising shopping malls are identical, a display order of a product of the advertising shopping mall may be re-determined based on any one of the 'price', the 'release day', the 'delivery cost', and the 'remaining balance', which are added to the database fields.

The advertising item may be assigned with a right to enable displaying product information with respect to the determined top M number of advertising shopping malls on a first page of a product search result page.

Thus, when sorting products in an order of a popularity, a product information display order determination method according to the present invention may display product information of the top M number of advertising shopping malls on the first page of the product search result page according to the display order based on the popularity about the N number of advertising shopping malls.

Also, the advertising item may be assigned with a right to enable displaying product information with respect to the determined top M number of advertising shopping malls in a particular area of the product search result page, among product information of the N number of advertising shopping malls. Here, the particular area is an eye-catching location of the product search result page when the product searcher searches for a product. The particular area may be designated when an advertising shopping mall makes a bid for the advertising item. Also, the particular area may correspond to a designated area in an upper end of a keyword search result screen or in an upper end of a category search result screen. Also, the particular area may correspond to a designated area in a lower end of the keyword search result screen or in a lower end of the category search result screen.

As described above, the product information display order determination method according to the present invention displays product information of the advertising shopping mall in the particular area of the product search result page according to the determined display order. Thus, it is possible to make the product searcher notice product information of the plurality of advertising shopping malls more easily than general product information.

Also, when displaying product information of the plurality of advertising shopping malls in the particular area of the product search result page, particular display information of the advertising item may be added thereto. Specifically, since the advertising item adds the particular display information to product information of the advertising shopping mall in the product search result page, the product searcher may notice product information advertising shopping malls more easily than other general product information.

Also, the advertising item may be utilized when sorting product information in an order of a popularity on the product search result page. Specifically, when sorting the product information in an order of the popularity on the product search result page, the advertising item may be assigned with a right to enable displaying product information of the advertising shopping mall on the first page of the product search result page according to the determined display order.

Also, when sorting product information of the advertising shopping mall in an order of a price on the product search result page, particular display information of the advertising item may be added to the product information of the advertising shopping mall, and display the product information in a lower end of the first page of the product search result page.

Also, a valid period of the advertising item is designated, and the advertising item may display the product information of the advertising shopping mall in the particular area of the product search result page only during the valid period. Also, when the valid period has elapsed, the advertising item may re-sort and display the display order with respect to the product information of the advertising shopping mall in the same format as other general product information.

FIG. 14 is a block diagram illustrating a configuration of a product information display order determination system 1400 according to an exemplary embodiment of the present invention.

Referring to FIG. 14, the product information display order determination system 1400 includes a receiving component 1410, an extraction component 1420, and a determination component 1430.

The receiving component 1410 receives a bid amount to purchase an advertising item associated with a product search keyword or a product category from a plurality of shopping malls.

The extraction component 1420 extracts an N number of advertising shopping malls that have successfully purchased the advertising item according to the received bid amount. Specifically, the extraction component 1420 may extract an N number of shopping malls, which are sorted in a descending order of the bid amount received from the plurality of shopping malls, as the advertising shopping malls. As an example, when the bid amount was received from 12 shopping malls, the extraction component 1420 may extract 8 shopping malls in a descending order of the received bid amount.

The determination component 1430 determines a display order with respect to product information of a top M number of advertising shopping malls by using at least one of a popularity, a reliability, and an accuracy about the N number of advertising shopping malls. Here, the display order is not affected by the bid amount, and determined by the popularity, the reliability, and the accuracy about product information of the advertising shopping mall.

Also, the determination component 1430 may re-determine a display order of a product of the advertising shopping mall based on any one of a price, a release day, a delivery cost, and a remaining balance for product information of the advertising shopping mall, when the determined display order is identical.

The product information providing method or the product information display order determination method according to the above-described exemplary embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, there is provided a method and system for providing product information, which can retrieve an advertising shopping mall that has suggested a bid amount for an upper display area, and can sort product information of the retrieved advertising shopping mall according to a predetermined standard, and display the sorted product information in the upper display area and also can sort product information according to various types of standards, such as a popularity, a sales volume, and the like, and display the sorted product information in a remaining area excluding the upper display area, when sorting and displaying product information on a product search result page.

Also, according to the present invention, there is provided a method and system for providing product information, which can display product information, added with an advertising item, to be easily distinguished from existing search product information.

Also, according to the present invention, there is provided a method and system for providing product information, which can display product information, added with an advertising item, on a first page of a product search result page.

Also, according to the present invention, there is provided a method and system for providing product information, which can display product information, added with an advertising item, in a particular area of a product search result page associated with a product category or a product search keyword.

Also, according to the present invention, there is provided a method and system for providing product information, which can attract a product searcher's attention by displaying product information added with particular display information according to an advertising item.

Also, according to the present invention, there is provided a method and system for providing product information, which can display product information, added with an advertising item, in a particular area of a product search result page, only during a valid period of an advertising item.

Also, according to the present invention, there is provided a method and system for providing product information, which can display product information, added with an advertising item, in a particular area of a product search result page when sorting the product information in an order of a popularity.

Also, according to the present invention, there is provided a method and system for determining a display order of product information, which can retrieve an advertising shopping mall that has suggested a bid amount for an upper display area, and determine a display order of product information of the advertising shopping mall according to a predetermined standard, when sorting and displaying the product information on a product search result page.

Also, according to the present invention, there is provided a method and system for determining a display order of product information, added with an advertising item, to be easily distinguished from existing search product information.

Also, according to the present invention, there is provided a method and system for determining a display order of product information, which can display product information, added with a desired advertising item, on a first page of a product search result page.

Also, according to the present invention, there is provided a method and system for determining a display order of product information, which can display product information, added with a desired advertising item, in a particular area of a product search result page associated with a product category or a product search keyword.

Also, according to the present invention, there is provided a method and system for determining a display order of product information of an advertising shopping mall according to a popularity of an advertising product.

Also, according to the present invention, there is provided a method and system for determining a display order of product information of an advertising shopping mall according to a reliability of an advertising product.

Also, according to the present invention, there is provided a method and system for determining a display order of product information of an advertising shopping mall according to an accuracy of an advertising product associated with a search keyword.

Also, according to the present invention, there is provided a method and system for determining a display order of product information, which can re-determine a display order according to a predetermined standard, such as a price, a release day, a delivery cost, a remaining balance, and the like, when display orders of product information of a plurality of advertising shopping malls determined based on a popularity, a reliability, and an accuracy are identical to each other.

Also, according to the present invention, there is provided a method and system for determining a display order of product information, which can attract a product searcher's attention by displaying product information, added with particular display information according to an advertising item, according to a determined display order.

Also, according to the present invention, there is provided a method and system for determining a display order of product information, which can display product information, added with an advertising item, in a particular area of a product search result page only during a valid period of the advertising item.

Also, according to the present invention, there is provided a method and system for determining a display order of product information, which can display product information, added with an advertising item, in a particular area of a product search result page when sorting product information in an order of a popularity.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A method that uses a processor to provide product information in a product search service, the method comprising:
   receiving at least one bid for being listed in a product search result list from a plurality of sellers, the bid being associated with at least one of a product search keyword or a product category, the bid being indicative of a bid amount, the product search result list being displayed in response to a user's request for product search;
   selecting at least one of the received bids based at least in part upon the bid amount;
   ordering, using the processor, product information of the sellers' items of the selected bids on a product search result list based at least in part upon a variable condition, the product search result list being associated with at least one of the product search keyword or the product category, the variable condition being independent of the seller's bid amount; and
   charging the seller's account with an advertising cost according to the number of clicks on the displayed product information,
   wherein the variable condition is a reliability about the selected sellers, an accuracy about the selected sellers, or both the reliability and the accuracy about the selected sellers.

2. The method of claim 1, wherein at least one of the selected bids is associated with a location to be displayed on the product search result list.

3. The method of claim 1, wherein the step of ordering product information comprises sorting the product information on the product search result list based upon both the bid amount and the variable condition, and the bid amount is associated with a location to be displayed on the product search result list.

4. The method of claim 3, wherein the selected bid is associated with a valid period to be displayed in a particular area of the product search result list, and
   the step of ordering the product information comprises:
      ordering the product information of the sellers' items of the selected bids on the product search result list based at least in part upon the variable condition only during the valid period according to the selected bid; and
      re-ordering the product information of the sellers' items of the selected bids based upon the variable condition when the valid period has expired.

5. The method of claim 1, wherein the step of ordering the product information displays particular product information of the sellers' items of the selected bids on a basic information screen of a particular product.

6. A system for providing product information in a shopping product search service, the system comprising:
   an interface, the interface to receive at least one bid for being listed in a product search result list from a plurality of sellers, the bid being associated with at least one of a product search keyword or a product category, the bid being indicative of a bid amount, the product search result list being displayed in response to a user's request for product search;
   a first determination component, the first determination component to determine at least one of the received bids based at least in part upon the bid amount;
   a second determination component, the second determination component to determine a display order of product information of the sellers' items of the selected bids on a product search result list based at least in part upon a variable condition, the product search result list being associated with at least one of the product search keyword or the product category, the variable condition being independent of the seller's bid amount;
   a display, the display to display product information of the plurality of selected sellers on a product search result page in response to a user's request for product search, the product search result page being associated with the product search keyword or the product category; and
   a charging component, the charging component to charge the seller's account with an advertising cost according to the number of clicks on the product information,
   wherein the variable condition is a reliability about the selected sellers, an accuracy about the selected sellers, or both the reliability and the accuracy about the selected sellers.

7. The system of claim 6, wherein the display displays product information of the plurality of selected sellers on a first page or in a particular area of the product search result page.

8. The system of claim 6, wherein the selected bid is associated with a valid period to be displayed in a particular area of the product search result list, and the display displays re-ordered product information of the sellers of the selected bids based upon the variable condition when the valid period has expired.

9. The system of claim 6, wherein at least one of the selected bid is associated with a location to be displayed on the product search result list.

10. The system of claim 6, wherein the second determination component selects a first number of the received bids based at least in part on the bid amount, and determines a display order with respect to product information of a second number of the sellers among the selected sellers by using the variable condition about the first number of the selected sellers, the second number of the sellers being listed in the top portion of the product search result list.

11. A non-transitory computer-readable medium having computer-executable instructions embodied thereon for providing product information in a product search service, comprising:
   code to receive at least one bid for being listed in a product search result list from a plurality of sellers, the bid being associated with at least one of a product search keyword or a product category, the bid being indicative of a bid amount, the product search result list being displayed in response to a user's request for product search;
   code to select at least one of the received bids based at least in part upon the bid amount;
   code to order product information of the sellers' items of the selected bids on a product search result list based at least in part upon a variable condition, the product search result list being associated with at least one of the product search keyword or the product category, the variable condition being independent of the seller's bid amount; and
   code to charge the seller's account with an advertising cost according to the number of clicks on the displayed product information,
   wherein the variable condition is a reliability about the selected sellers, an accuracy about the selected sellers, or both the reliability and the accuracy about the selected sellers.

* * * * *